(12) United States Patent
Rudeen

(10) Patent No.: US 8,172,145 B2
(45) Date of Patent: May 8, 2012

(54) ENHANCED VIRTUAL SCAN LINE PROCESSING

(75) Inventor: Robert William Rudeen, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 622 days.

(21) Appl. No.: 12/273,381

(22) Filed: Nov. 18, 2008

(65) Prior Publication Data

US 2009/0127326 A1 May 21, 2009

Related U.S. Application Data

(60) Provisional application No. 60/989,195, filed on Nov. 20, 2007.

(51) Int. Cl.
*G06K 9/32* (2006.01)
*G06K 7/00* (2006.01)
(52) U.S. Cl. ............... 235/462.08; 235/435; 235/462.09
(58) Field of Classification Search ............. 235/462.08, 235/462.12, 462.09
See application file for complete search history.

(56) References Cited

U.S. PATENT DOCUMENTS

| | | | |
|---|---|---|---|
| 5,298,728 A | 3/1994 | Elliott et al. | |
| 5,371,361 A | 12/1994 | Arends et al. | |
| 5,446,271 A | 8/1995 | Cherry et al. | |
| 5,463,211 A | 10/1995 | Arends et al. | |
| 5,478,997 A | 12/1995 | Bridgelall et al. | |
| 5,493,108 A | 2/1996 | Cherry et al. | |
| 5,545,887 A * | 8/1996 | Smith et al. | 235/462.08 |
| 5,635,699 A | 6/1997 | Cherry et al. | |
| 5,929,421 A | 7/1999 | Cherry et al. | |
| 6,142,376 A | 11/2000 | Cherry et al. | |
| 6,155,488 A | 12/2000 | Olmstead et al. | |
| 6,170,749 B1 | 1/2001 | Goren et al. | |
| 6,371,371 B1 | 4/2002 | Reichenbach | |
| 6,513,714 B1 | 2/2003 | Davis et al. | |
| 6,561,427 B2 | 5/2003 | Davis et al. | |
| 6,585,157 B2 | 7/2003 | Brandt et al. | |
| 6,827,273 B2 | 12/2004 | Wilz, Sr. et al. | |
| 6,877,663 B2 | 4/2005 | Kelly et al. | |
| 6,969,004 B2 | 11/2005 | Ralph et al. | |
| 6,981,644 B2 | 1/2006 | Cheong et al. | |
| 7,062,099 B2 * | 6/2006 | Li et al. | 382/237 |

(Continued)

FOREIGN PATENT DOCUMENTS

JP 08137983 5/1996

(Continued)

OTHER PUBLICATIONS

International Searching Authority, International Patent Application No. PCT/US08/84084, International Search Report and Written Opinion, Jun. 30, 2009, 6 pages.

(Continued)

*Primary Examiner* — Thien M. Le
*Assistant Examiner* — Christle Marshall
(74) *Attorney, Agent, or Firm* — Stoel Rives LLP

(57) ABSTRACT

Systems and methods for decoding a barcode or other optical code include identifying one or more sub-regions of image data that contain promising data based on a first set of edge detection parameters, transferring the promising data from a first memory location to a new memory location for further processing, and decoding the promising data based on a different set of edge detection parameters.

40 Claims, 5 Drawing Sheets

U.S. PATENT DOCUMENTS

| | | | |
|---|---|---|---|
| 7,299,975 B2 | 11/2007 | McQueen et al. | |
| 7,398,927 B2 | 7/2008 | Olmstead et al. | |
| 7,743,994 B2 | 6/2010 | Actis | |
| 2001/0006191 A1* | 7/2001 | Hecht et al. | 235/462.16 |
| 2003/0127518 A1 | 7/2003 | Park et al. | |
| 2003/0218069 A1 | 11/2003 | Meier et al. | |
| 2004/0004128 A1 | 1/2004 | Pettinelli et al. | |
| 2005/0077358 A1 | 4/2005 | Boehm et al. | |
| 2005/0116044 A1 | 6/2005 | Zhu et al. | |
| 2005/0274809 A1 | 12/2005 | Colley | |
| 2006/0027657 A1 | 2/2006 | Ninnink et al. | |
| 2006/0081712 A1* | 4/2006 | Rudeen et al. | 235/462.08 |
| 2006/0108424 A1 | 5/2006 | Kim et al. | |
| 2006/0278708 A1 | 12/2006 | Olmstead | |
| 2006/0278712 A1 | 12/2006 | Olmstead | |
| 2008/0169347 A1 | 7/2008 | Olmstead | |

FOREIGN PATENT DOCUMENTS

| | | |
|---|---|---|
| KR | 1020010044743 | 6/2001 |
| WO | WO 2006/049430 A1 | 5/2006 |

OTHER PUBLICATIONS

European Patent Office, Supplementary European Search Report, European Patent Application No. 08 851 153.0, dated Dec. 22, 2010, 5 pages.

\* cited by examiner

ENHANCED VIRTUAL SCAN LINE PROCESSING

RELATED APPLICATIONS

This application claims the benefit under 35 U.S.C. §119(e) of U.S. Provisional Application No. 60/989,195, filed Nov. 20, 2007, which is hereby incorporated by reference in its entirety.

TECHNICAL FIELD

The field of the present disclosure relates to systems, methods, and apparatus for extracting data from machine-readable indicia, such as barcodes or other optical codes, using a plurality of scan parameters.

BACKGROUND INFORMATION

Barcodes have widespread applications. For example, barcodes can be used to identify a class of objects (e.g., merchandise) or unique items (e.g., patents). As a result, barcodes are found on a wide variety of objects, such as goods, company assets, and documents, and help track production at manufacturing facilities and inventory at stores (by scanning items as they arrive and as they are sold).

A barcode essentially is a machine-readable representation of information in a visual format on a surface of the object—i.e., an optical code. Some barcodes use a dark ink on a white substrate to create high and low reflectance upon scanning. Based on the symbology being used (e.g., UPC, Code 39, Code 128, PDF417, etc.), a barcode may comprise data characters (or codewords in the case of, e.g., PDF417) and/or overhead characters represented by a particular sequence of bars and spaces (which may have varying widths).

Typically barcodes contain data characters including a single group of bars and spaces that represent the encoded numbers, letters, punctuation marks, or other symbols. In other words, the data characters are the smallest subset of bars and spaces that contain data. In certain symbologies, the data characters may represent more than one number, letter, etc. For example, Code 128 is capable of encoding two numbers into one character width (double density). The overhead characters include a group of bars and spaces that represent, e.g., start characters, stop characters, center characters, guard characters, and/or check characters. For example, a pair of guard characters may delimit the beginning and end of a barcode and a center character may separate the barcode into two halves. A check character may serve as a redundancy check used for error detection (similar to a binary checksum). For example, the check character could be computed from the other characters in the barcode.

Optical code readers are used to optically capture barcode patterns or other symbols or information imprinted on various surfaces in order to transmit the information encoded in the barcode pattern or symbol to a host processing device. Two types of commonly used optical code readers are flying spot scanners and imaging based scanners. Flying spot laser scanners generally obtain barcode information by sweeping a laser spot across the barcode. The laser spot may be generated from a light source inside an oscillating reflecting surface, typically a mirror. The light reflected from the barcode is collected by a photosensor, which outputs an analog waveform representing the relative spacing of the bars in the barcode. The analog signal may then be digitized and decoded into data representing the information encoded in the barcode.

Imaging based scanners include solid state image circuitry, such as charge coupled devices (CCDs), and may be implemented using a one-dimensional or two-dimensional imaging array of photosensors (or pixels) to capture the barcode. One-dimensional CCD readers capture a linear cross section of the barcode at once, producing an analog waveform whose amplitude represents the relative darkness and lightness of the barcode. Two-dimensional CCD readers capture an entire two-dimensional image at once. Generally only select portions of the image data are stored and processed. The select portions of the image data are sometimes referred to as virtual scan lines because the select portions are analogous to a signal generated by reflection of a moving laser beam spot scanning across the barcode.

The effectiveness of an imaging system employing virtual scan lines may be limited by how accurately edge transitions (that signify the bars and spaces) are identified by the edge detector. For example, based on limitations in edge detection parameters edge transitions may be missed or erroneous edge transitions may be identified, which may ultimately require the barcode to be rescanned. Accordingly, the present inventor has identified a need for enhanced virtual scan line processing for decoding barcodes that avoids the need to rescan the barcode.

DETAILED DESCRIPTION OF EMBODIMENTS

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Overview

Before describing detailed examples of enhanced virtual scan line processing, a representative data reader and associated concepts will first be described.

Figure 1:
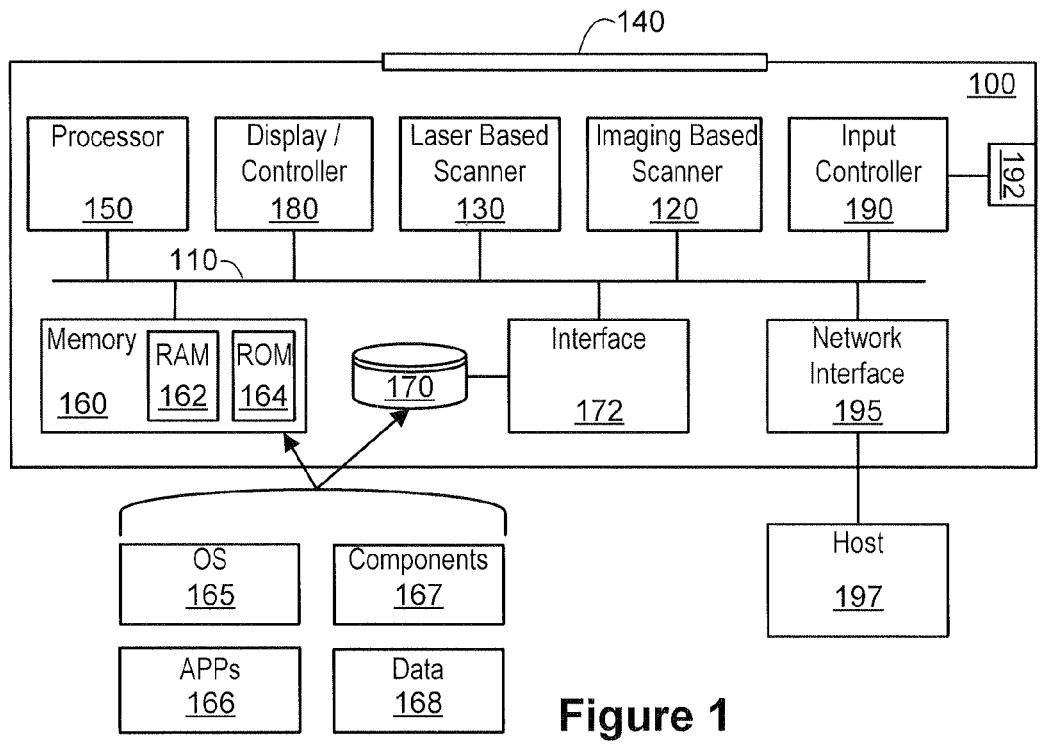
FIG. 1 is a block diagram of an optical code reader including an imaging based scanner, according to one embodiment.

FIG. 1 is a block diagram showing operational components of an optical code reader 100, according to one embodiment. While a bus-based architecture, based on a bus 110, is illustrated in FIG. 1, other types of architectures are also suitable. The optical code reader 100 may incorporate any number of data readers, such as an imaging based scanner 120, a laser based scanner 130, or both. The imaging based scanner 120 and laser based scanner 130 attempt to read encoded symbols through a window 140. Of course, other configurations are possible. For example, the optical code reader 100 may include only an imaging based scanner 120, only a laser based scanner 130, or any combination thereof. Additionally, the optical code reader 100 may comprise a multiwindow scanner, such as a two window scanner sometimes referred to as a bioptic scanner, including a lower window arranged in a generally horizontal plane and an upper window arranged in a generally vertical plane with imaging based scanners, laser based scanners, or both, attempting to read encoded symbols through the windows.

The optical code reader 100 may include a number of other components that interface with one another via the bus 110, including a processor 150, memories 160 and 170, a display controller and display device 180, an input controller 190, and a network interface 195. The processor 150 may be any commercially available processor or other logic machine capable of executing instructions. Additionally, more than one processor may be provided. The display controller and display device 180 may be provided to present data, menus, and prompts, and otherwise communicate with the user via one or more display devices, such as a transmissive or reflective liquid crystal display (LCD), cathode ray tube (CRT) display, or other suitable display.

The standard input controller 190 may be configured to receive user input from a keyboard, a pointing device, or other wired/wireless input devices. According to one embodiment, the input controller 190 comprises a universal interface driver application specific integrated circuit (UIDA). Further details of the UIDA can be found in U.S. Pat. No. 6,877,663, which is hereby incorporated by reference in its entirety. Other input devices may be included, such as a microphone, touchscreen, touchpad, and trackball. While the input devices may be integrated into the optical code reader 100 and coupled to the processor 150 via the input controller 190, input devices may also connect via other interfaces, such as a connector 192. The connector 192 may include one or more data interfaces, bus interfaces, wired or wireless network adapters, or modems for transmitting and receiving data. Accordingly, the input controller 190 may include one or more of hardware, software, and firmware to implement one or more protocols, such as stacked protocols along with corresponding layers. Thus, the connector 192 may function as one or more of a serial port (e.g., RS232), a Universal Serial Bus (USB) port, and an IR interface. The input controller 190 may also support various wired, wireless, optical, and other communication standards.

The network interface 195 may be provided to communicate with one or more hosts 197 or other devices (e.g., a computer or a point-of-sale terminal). For example, data gathered by, or decoded by, the image based scanner 120 or laser based scanner 130 may be passed along to the host computer 197. The network interface 195 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radiofrequency identification (RFID).

The optical code reader 100 may include memory 160, which may be implemented using one or more standard memory devices. The memory devices may include, for instance, RAM 162, ROM 164, and EEPROM devices, and may also include magnetic or optical storage devices, such as hard disk drives, flash memory, CD-ROM drives, and DVD-ROM drives. The optical code reader 100 may also include an interface 172 coupled to an internal hard disk drive 170. In addition, the interface 172 may also be coupled to a magnetic floppy disk drive (not shown), an optical disk drive (not shown), or another drive and may be configured for external drive implementations, such as over a USB, IEEE 1194, or PCMCIA connection.

According to one embodiment, any number of program modules are stored in the drives (e.g., drive 170) and ROM 164, including an operating system (OS) 165, one or more application programs 166, other program modules 167 (e.g., instructions to implement the methods described below), and data 168. All or portions of the program modules may also be cached in RAM 162. Any suitable operating system 165 may be employed. One of the program modules 167 may comprise a set of instructions to implement the enhanced virtual scan line processing described in more detail below.

Other versions of the optical code reader 100 may have less than all of these components and/or may contain other components. The optical code reader 100 may comprise a fixed scanner, such as a Magellan® scanner manufactured by Datalogic Scanning, Inc. of Eugene, Oreg. However, the optical code reader 100 may also comprise other types of scanners, such as a portable scanner.

Figure 2:
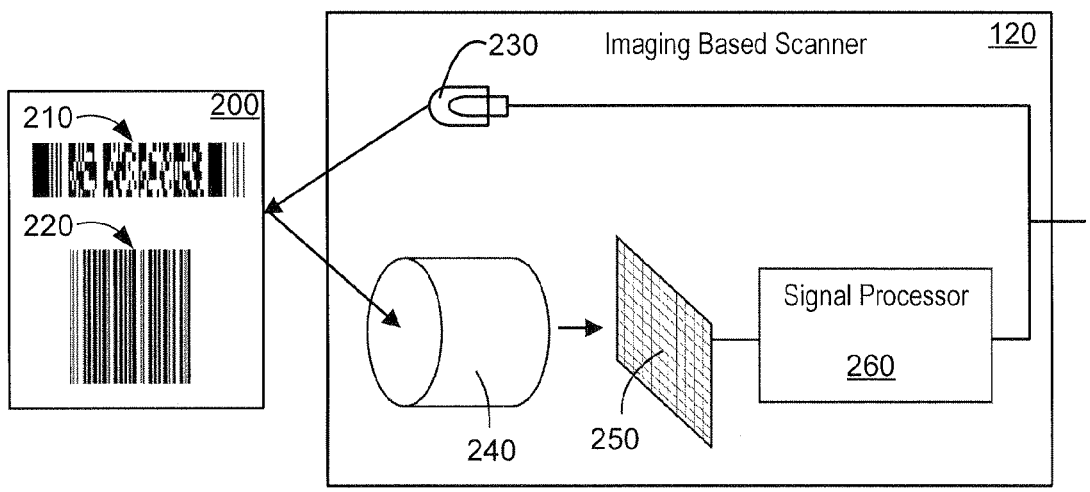
FIG. 2 is a block diagram of the imaging based scanner of FIG. 1.

FIG. 2 is diagram of an imaging based scanner 120 for forming an image of an item or object 200, according to one embodiment. The object 200 may be any object, but in one preferred use, the object 200 is an item upon which is printed an optical code, such as barcode 210 (PDF417) and barcode 220 (Code 128). The imaging based scanner 120 comprises an illumination source 230, a lens assembly 240, an imager 250, and a signal processor 260. The imaging based scanner 120 may comprise other components not illustrated or may omit certain components illustrated, such as the illumination source 230 and thus rely on ambient light. The illumination source 230 may comprise any suitable source of light, such as a row of light emitting diodes (LEDs), flash strobes, or incandescent or fluorescent lamps.

The lens assembly 240 may comprise one or more lenses for focusing light on imager 250. For example, lens assembly 240 may comprise a rotationally symmetric lens with increased light collection efficiency with respect to a well-focused lens for a given depth of field. The lens assembly 240 may also comprise a zoom lens coupled to the processor 150 to control an amount of optical zoom. The imager 250 forms an electronic image of the object 200. The imager 250 may comprise a wide range of image sensing devices for converting an optical image (or another wave in the electromagnetic spectrum) into an electrical signal. For example, the imager 250 may be a digital camera, such as a charge-coupled device (CCD) camera or complimentary metal-oxide semiconductor (CMOS) camera, both of which form a one-dimensional or two-dimensional array of pixels, which together constitute an electronic representation of the image. Each pixel location stores data indicative of the light intensity at that location of the image. The light intensity data for each pixel may be a color-coded vector (e.g., red-green-blue) or monochrome intensity (e.g., grayscale).

After the imager 250 has been exposed to light reflected by the object 200, data from all the pixels can be sequentially read out in a selectable pattern (which may be row-by-row, column-by-column, or some other pattern). The signal processor 260 conditions the data received from the imager 250 and may generate an output that generally identifies which regions of the image correspond to light areas, and which correspond to dark areas. For example, the signal processor 260 may set the exposure time and thresholding so that the bars or relatively darker regions of the barcode or other target are reported as being dark, and the spaces or relatively lighter regions between the bars or darker regions are reported as being light, according to any of a number of techniques. Either analog or digital signal processing may be utilized in the signal processor 260. While the imager 250 and the signal processor 260 may be contained in the same integrated circuit, other configurations are possible. For example, the signal processor 120 may be implemented by the processor 150 (FIG. 1) or one or more other logic machines capable of executing instructions.

Figure 3:
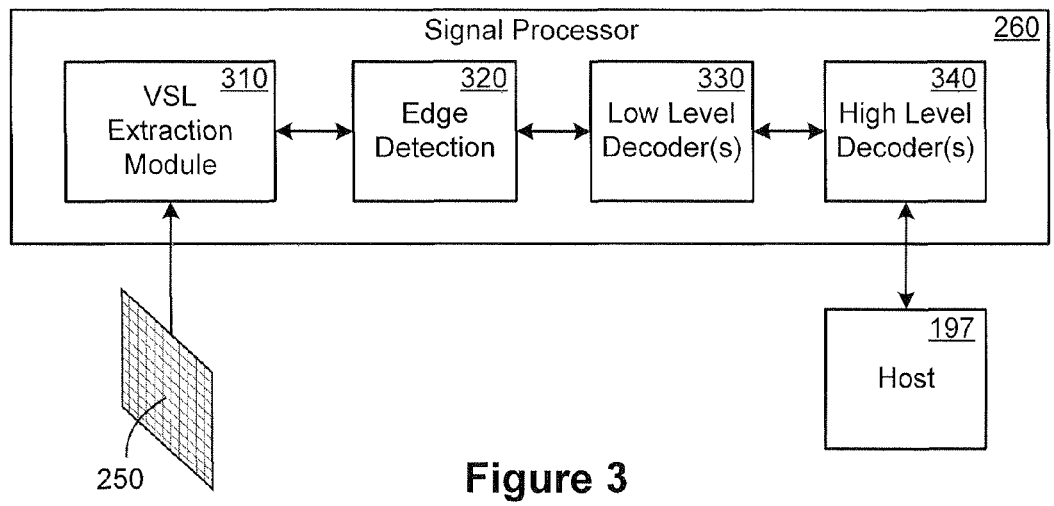
FIG. 3 is a block diagram illustrating an example signal processor, according to one embodiment.

FIG. 3 is a block diagram illustrating an example signal processor, according to one embodiment. The optical code reader 100 may have a scan rate of approximately 30 to approximately 200 frames per second, for example. Of course, scan rates outside of this range may also be used. Thus, according to one embodiment, only a select portion or sub-region of the image data captured by the imager 250 corresponding to one or more virtual scan lines is stored and processed. However, all of the image data captured by the imager 250 may be used to search for and decode a barcode. The signal processor 260 may include a virtual scan line extraction module 310 to read or assemble samples or pixels from the imager 250 lying along one or more lines across the image at arbitrary angles with respect to one another or in another desired scan pattern. Thus, the virtual scan line extraction module 310 defines and maps virtual scan lines onto a raster pattern, thereby allowing the pixels of the raster which fall on the virtual scan lines to be identified and stored for later processing. Storing only a select portion of the image data corresponding to virtual scan lines reduces the total amount of data that needs to be stored and processed.

Edge detection module 320 identifies edge transition locations using any number of edge detection techniques. For example, after an image of the object 200 has been captured by the imager 250, the image may be represented by a certain number of pixels, each of which is represented by a certain value. For a grayscale image where each pixel is represented by 8 bits, each pixel may have a value ranging from 0 (black) to 255 (white) with various shades of gray between 0 and 255. While the image may be a grayscale image, it may also be a color image or a black-and-white image. Additionally, while each pixel may be represented by 8 bits, each pixel may be represented by any number of bits (e.g., 10 bits or 12 bits). Further, while the following discussion refers to the entity under analysis as pixels, the entity under analysis may also be a subpixel, sub-block of the image, sub-region of the image, or any other region of the image being used in edge detection.

Because edges in images generally have strong intensity contrasts, an increase (or decrease) in intensity from one pixel to the next is indicative of an edge. Accordingly, many edge detection techniques involve calculating a derivative of the intensity changes in pixel values. With regard to a first derivative, an edge transition can occur at a local maxima. With regard to second derivatives, edges occur at zero crossings.

The edge detection process disclosed in U.S. Patent Publication No. 2008/0169347 discloses attempting to locate edges by convolving image data with a kernel that approximates a first or second derivative. U.S. Patent Publication No. 2008/0169347 is hereby incorporated by reference in its entirety.

According to one edge detection technique, pixel values of adjacent pixels are compared to identify edge transitions. For example, a pixel value of a current pixel can be compared to a pixel value of a previous pixel. If the compared value is greater or equal to a threshold value, an edge has been found. If the compared value is less than the threshold value, the pixel location is incremented and the value of the new pixel location is compared to the value of the pixel in the previous location. This process can be continued until an edge is found, the current pixel location reaches an end point, or both. For example, a virtual scan line may have the following sequence of pixel values: 12-2-19-10-193-180-190. By comparing the values of adjacent pixels, an edge may be identified between fourth and fifth pixel values (e.g., the difference between adjacent pixel values is 10-17-9-183-13-10). As long as the threshold is set above 17 and at or below 183, only one edge transition will be identified. In other words, the threshold value helps define the minimum modulation percentage in the grayscale level between adjacent pixels needed to signify an edge transition.

According to another edge detection technique, the current pixel value may be compared to more than one adjacent pixel. For example, if a virtual scan line has a sequence of pixel values of 6-10-80-15-20-22-151-110-136, the difference between adjacent pixel values is 4-70-65-5-2-129-41-26. If the third pixel (having a value of 80) is noise, an edge may be erroneously detected. However, by comparing the current pixel value to an average of a window of pixels, the effect of the third pixel value can be minimized. For example if the window is set at three pixels and the fourth pixel is being compared, a difference of 17 (((6+10+80)/3)−15) is calculated, instead of 65 (80−15).

Of course, the edge detection module 320 may use any number of other edge detection techniques, such as subpixel edge detection. Subpixel edge detection may reduce the number of pixels needed for a given image region by interpolating subpixels between integer pixels. Further details of subpixel edge detection can be found in U.S. Pat. No. 5,446,271, which is hereby incorporated by reference in its entirety. Further, any number of edge detection operators (or variations of operators) may be used. For example, first order operators, such as Canny, Prewitt, Sobel, and Roberts Cross, may be used. In addition, second order operators, such as Marr-Hildreth, may be used.

Based on the edge locations, a low level decoder 330, a high level decoder 340, or both, may convert the sequence of edges and spacing between the edges into data usable by the host 197. For example, the low level decoder 330 may convert the sequence of edges and spacing between the edges into a set of barcode elements, such as bars and spaces, and the high level decoder 340 may convert the barcode elements into characters, which may be alphanumeric. Of course, the low level decoder 330, the high level decoder 340, or both, may vary depending on the particular symbology used to encode the data. For example, in the PDF417 symbology data is encoded by (1) converting data into codewords (i.e., high level encoding) and (2) representing the codewords with a certain sequence of bars and spaces (i.e., low level encoding). In the PDF417 symbology, data may be decoded by (1) converting the sequence of bars and spaces into codewords (i.e., low level decoding) and (2) converting the codewords into data (i.e., high level decoding). Thus, after the edge detection module 320 identifies edges in the data captured by the imager 250, the relative locations of the edge transitions can be converted back into codewords via a low level decoder (e.g., the low level decoder 310). A high level decoder (e.g., the high level decoder 340) can then convert the codewords into data usable by the host 197.

Of course, the signal processor 260 may further process the output from the low level decoder 330, the high level decoder 340, or both, before sending the data to the host 197. For example, the decoded data (e.g., partial sections of a barcode) may be stitched together to form data representing a complete barcode. Additionally, the signal processor 260 may further comprise other modules, such as an amplification module to amplify one or more spatial frequencies, a filtering module, and a timer module. The timer module may be used to indicate when to stop attempting to find characters. For example, to maximize throughput, the edge detection module 320, the low level decoder 330, the high level decoder 340, or any combination thereof, may stop looking for characters after a certain period of time or after a certain number of data frames have been captured. In other words, the timer module prevents the edge detection and decoder modules from spending too much time trying to decode data that is not readable or decodable (or at least not easily readable or decodable) or that has already been decoded.

Figure 4:
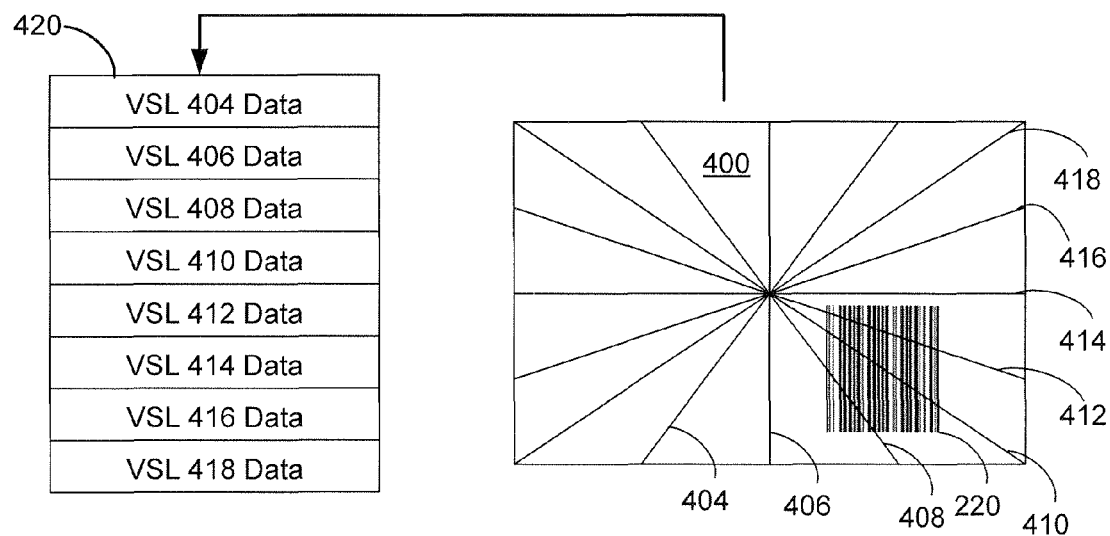
FIG. 4 illustrates the optical code reader of FIG. 1 capturing data along virtual scan lines and storing virtual scan line data in a virtual scan line buffer.

FIG. 4 diagrammatically illustrates reading or assembling samples or pixels from the imager 250 or a raster image 400 lying along one or more virtual scan lines 404 through 418 and storing virtual scan line data in a virtual scan line buffer 420. By way of example, the raster 400 represents a generally rectangular grid of image data captured by the image sensor and may comprise a data file wherein each pixel is represented by a certain number of bits. The virtual scan lines can be arranged in any pattern, which is generally designed so that there is a reasonable likelihood that at least one of the virtual scan lines will be coincident with a barcode, such as the barcode 220. Accordingly, the virtual scan line pattern may be defined based on the dimensions of the barcode to be scanned, the scanning area size, the scanning sensor and optics characteristics, the processing bandwidth, or any combination thereof. As shown in FIG. 4, virtual scan lines 410 and 412 are both coincident with the barcode 220. As shown, virtual scan line 408 only captures partial information about the barcode 220. However, this partial portion of the barcode 220 may be assembled with other partial portions to form a complete code using a process known as stitching, further details of which can be found in U.S. Pat. No. 5,493,108, which is hereby incorporated by reference in its entirety.

Pixel data corresponding to each of the virtual scan lines 404 through 418 is placed in the virtual scan line buffer 420. The virtual scan line buffer 420 may comprise a single memory array where the signal processor 260 chooses the appropriate memory address within the memory (e.g., memory 160, memory 170, a memory dedicated to the signal processor 260, or another memory) array for storing the pixel data. Because only selected pixels from the image sensor are stored in the virtual scan line buffer 420, sophisticated signal processing techniques (e.g., edge detection techniques and decoder algorithms) may be used while still allowing for a reasonable throughput of captured images.

The description of FIGS. 1 through 4 have provided an overview of an example data reader and associated concepts. Other examples and additional details regarding data readers, virtual scan lines, and associated concepts may be found in the following commonly owned United States patents and patent applications, which are incorporated by reference herein in their entireties: U.S. Pat. No. 5,446,271; U.S. Pat. No. 5,635,699; U.S. Pat. No. 6,142,376; U.S. Application Publication No. 2006/0278708; and U.S. Application Publication No. 2006/0081712.

Enhanced Virtual Scan Line Processing

The edge detection module 320 may sometimes fail to detect an edge transition or identify an erroneous edge transition, resulting in one or more undecodable characters or improperly decoded characters. For example, if the minimum modulation percentage (e.g., the smallest modulation between adjacent pixel sets that will be identified as an edge) is set too low, noise can trigger an edge and if the minimum modulation percentage is set too high, edge transitions may be missed. By way of another example, if the window threshold (e.g., the number of pixels that are averaged to determine an edge threshold) is too large or too small, an edge may be missed or an erroneous edge may be detected. If the edge detection module 320 does not identify the proper edge transitions from the captured data, the barcode may need to be rescanned thereby lowering the scanner's sweep performance and first pass read rate (i.e., the likelihood that a barcode will be read during its first pass after being presented to or swept past the scanner). Accordingly, a preferred embodiment varies the edge detection parameters (e.g., the modulation percentage or the window threshold) so that edge transitions missed (or erroneously detected) using one set of edge detection parameters are identified (or omitted) using another set of edge detection parameters.

Figure 5:
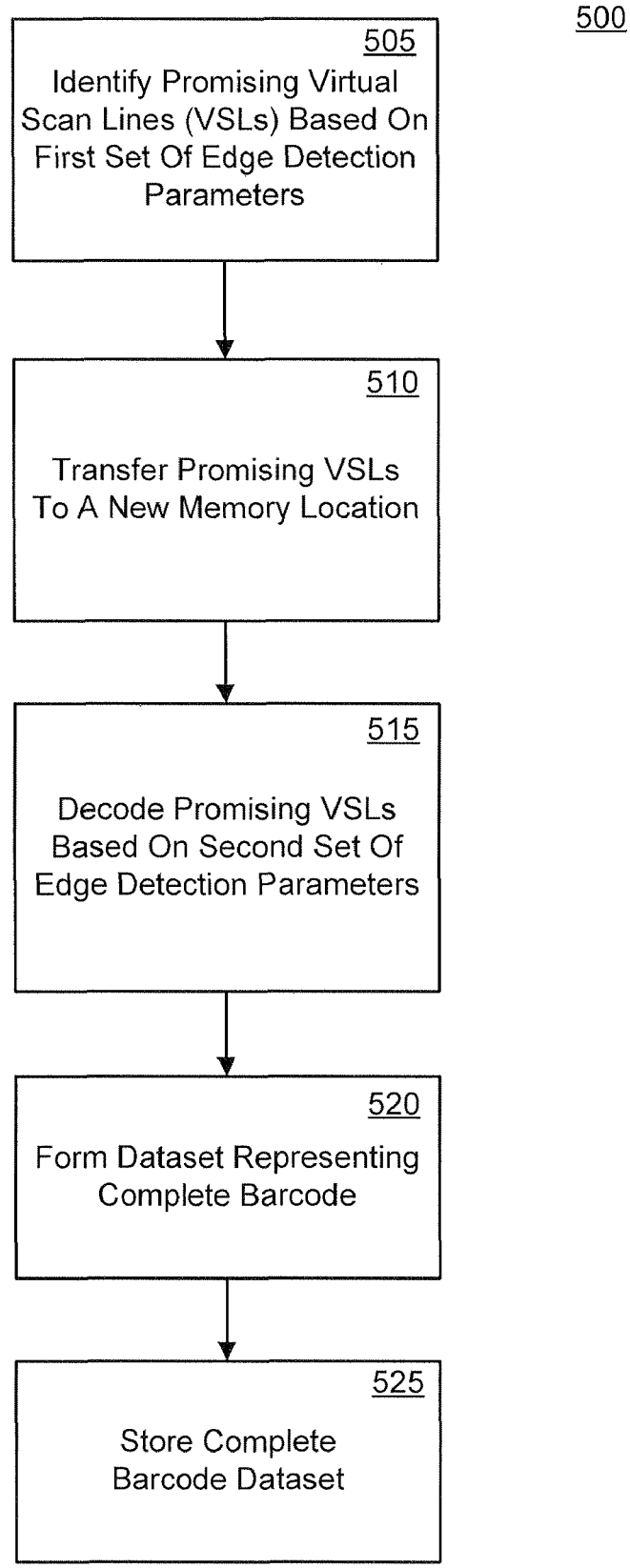
FIG. 5 is a flowchart illustrating a method of extracting data from a barcode, according to one embodiment.

FIG. 5 is a flowchart illustrating a method 500 of extracting data from a barcode, according to one embodiment. Initially, the object 200 is presented to the window 140 or swept past the window 140 (or the scanner is swept past the object) so that one or more images of the object 200 can be acquired (e.g., via imaging based scanner 120). Next, all or a portion of the image data may be stored in memory (e.g., raster 400 of FIG. 4). For example, the virtual scan line extraction module 310 may store pixel data corresponding to one or more virtual scan lines in the virtual scan line buffer 420 (or another reserved segment of memory used to hold data while it is being processed) as pixel data from an imaging array is serially read from the imager 250. Additionally, all or a portion of the pixel data may be stored in another memory for later processing. According to one embodiment, the data stored in the buffer (or other memory) is unprocessed or minimally processed (i.e., raw data directly from the imager 250). However, the data may be preprocessed before storing by any number of components, such as a preamplifier or a filter (e.g., a finite impulse response (FIR) filter or an anti-aliasing low pass filter).

Data corresponding to a sub-region or subset of a captured image may then be processed to identify edge transitions using a first set of edge detection parameters. For example, the edge detection module 320 may identify edge transition locations in the data using any number of edge detection techniques, such as those previously described. While the edge detection module 320 may process data from a buffer, such as the virtual scan line buffer 420, the edge detection module 320 may process data from another memory or process data as the data is read out from the imager 250. While certain embodiments analyze only select portions of the acquired image data (e.g., sub-regions or virtual scan lines), other embodiments analyze all the data captured by the imaging based scanner 120 (e.g., by sequentially processing the raster laterally or vertically).

At step 505, the method 500 identifies one or more sub-regions (or virtual scan lines) that contain promising data based on the edge transitions identified using the first set of edge detection parameters. For example, sub-regions containing promising data may be identified if the relative locations of edge transitions and spaces there between yield at least one valid character, codeword, overhead character, or combination thereof. Of course, sub-regions containing promising data may be identified in other ways, such as detecting a minimum number of edge transitions, detecting an unexpected number of edge transitions, and detecting element width distortion.

At step 510 the promising data from the virtual scan line buffer may be transferred to a new memory location, such as a promising virtual scan line buffer, for further processing. While not all embodiments transfer the promising data, storing the raw or filtered data in a different memory location may allow additional scan lines to be gathered (e.g., from subsequent frames), which can help with sweep performance, first pass read rate, or both. For example, the virtual scan line buffer 420 may be of a first-in, first-out (FIFO) type or have a limited size, so transferring the promising data to a new memory location frees space within the virtual scan line buffer 420. According to another embodiment, instead of transferring the promising data to a new memory location, the newly gathered scan lines may be stored in a different memory location (e.g., a location different from where the promising data is stored), which may help improve processing time (e.g., by saving clock cycles needed to move the promising data). According to still another embodiment, if there is sufficient processing power, the promising data may be processed using a different set of edge detection parameters before storing the promising data in a new location or gathering additional scan lines.

The promising data is decoded based on second set of edge detection parameters different from the first set of edge detection parameters, at step 515. For example, the edge detection parameters may be varied by altering the minimum modulation percentage (e.g., the smallest modulation that will be identified as an edge) or window threshold (e.g., the number of pixels that are averaged to determine an edge threshold). According to one embodiment, the promising data is decoded with the second set of edge detection parameters while data corresponding to additional virtual scan lines (e.g., from subsequent frames) is read into the virtual scan line buffer. If the promising data is not properly decoded with the second set of edge detection parameters, the promising virtual scan line may be discarded and the user may be prompted to rescan the barcode. However, certain embodiments may continually alter the edge detection parameters until the promising data is properly decoded. Thus, attempting to decode the promising data with a different set of edge detection parameters may avoid the need to rescan the barcode and result in increased sweep performance, a higher first pass read rate, or both.

If data corresponding to one virtual scan line is decoded using two or more different edge detection parameters, character to character correlation between the various decodes becomes more feasible because the location of the barcode on the virtual scan line does not change. Thus, if the first set of edge detection parameters result in one or more undecodable characters and the second set of edge detection parameters are able to decode the undecodable characters (e.g., by yielding different edge transitions), the method 500 can correlate the characters (e.g., line up the edges or characters) of the virtual scan line that were decoded using the different sets of edge detection parameters and substitute the decoded characters from the second set of edge detection parameters for the undecodable characters from the first set of edge detection parameters. Additionally, the method 500 may decode only a portion of the virtual scan line data corresponding to the undecodable characters using the second set of edge detection parameters in an attempt to save processing time. Further, the method 500 may compare the characters decoded from the virtual scan line using the first and second set of edge detection parameters to see which set of edge detection parameters result in the most accurate character decodes.

At step 520, the decoded promising virtual scan line data may be further processed to form a dataset representing a complete barcode. For example, a first virtual scan line may capture a portion of the barcode and a second virtual scan line may capture the rest of the barcode. These two partial portions of the barcode may be correlated and stitched together (possibly with other partial portions) to form a complete barcode. The decoded promising virtual scan line data may be stitched together with other decoded virtual scan line data or other decoded promising virtual scan line data from the same frame. Additionally, if multiple images of the barcode are captured at a certain frame rate as the object 200 is swept past the window 140, data may be correlated among various data frames and stitched together.

The complete barcode dataset may be stored at step 525 (e.g., in memories 160 or 170), transmitted to a computer (e.g., the host 197) for use or further decoding, or both. The computer may present data, prompts, and otherwise communicate with the user via one or more display devices. For example, the computer may present the decoded data to the user via a display, such as the object type (e.g., product type) corresponding to the scanned barcode and data associated with the object type (e.g., a price of the product). The data associated with the object type may be encoded in the barcode or accessed from a local or remote database based upon the object type. By way of another example, the computer may cause the decoded data to be recorded on a tangible medium. For example, the computer may instruct a printer to print the object type and data corresponding to the object type (e.g., print the product type and associated price on a receipt). The computer may be any machine that manipulates data according to a list of instructions (e.g., a point-of-sale terminal or any hardware/software used where a transaction takes place, such as a checkout counter in a shop). For example, the computer may comprise a mobile device, server, personal computer, or embedded computer.

Figure 6:
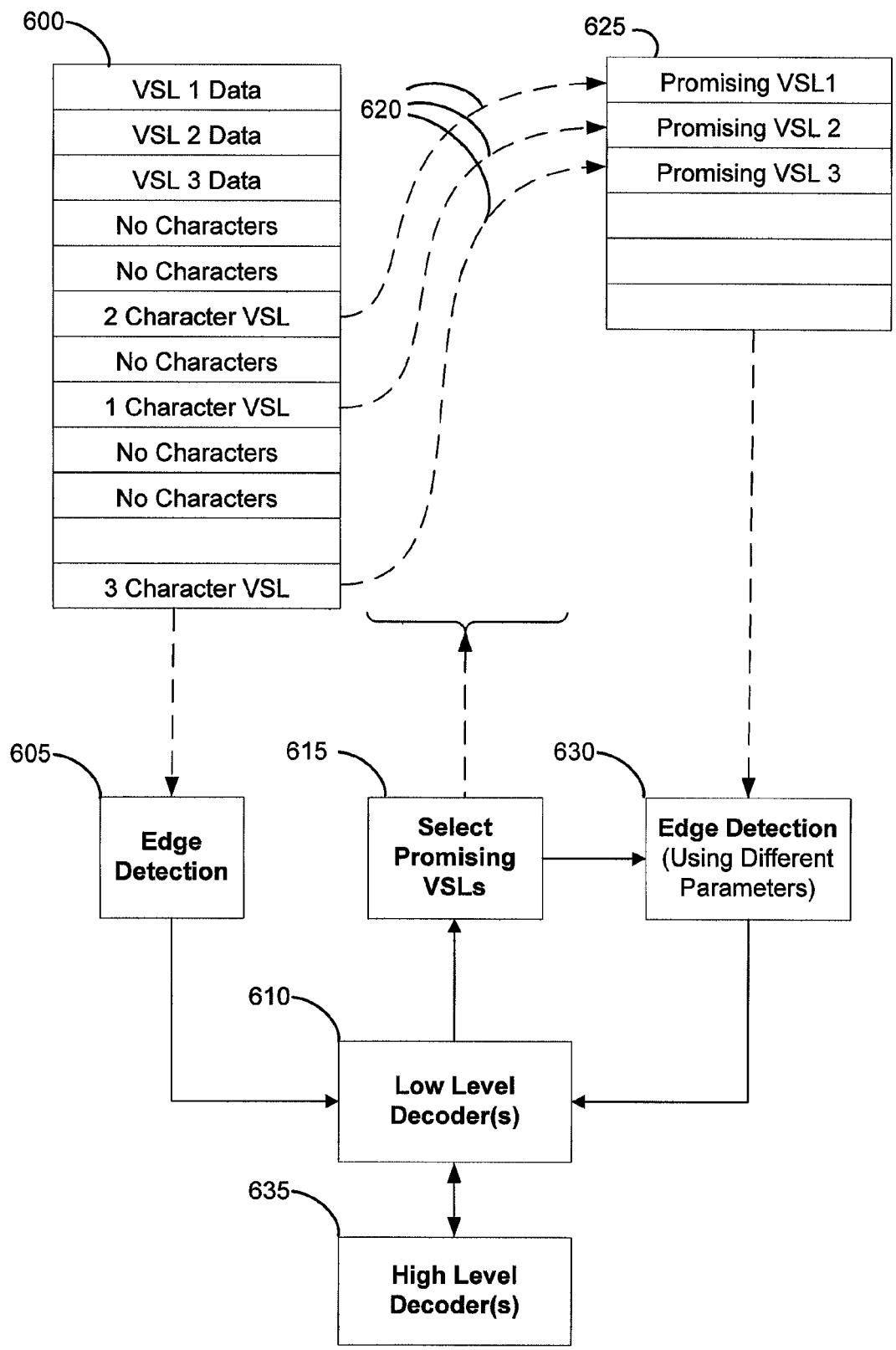
FIG. 6 is a block diagram illustrating selecting promising virtual scan lines and processing the promising virtual scan lines using different edge detection parameters, according to one embodiment.

FIG. 6 is a block diagram illustrating selecting promising virtual scan lines and processing the promising virtual scan lines using different edge detection parameters, according to one embodiment. As described with reference to FIG. 4, data corresponding to one or more virtual scan lines from the imager 250 may be stored in a virtual scan line buffer 600 (or directly accessed from a memory location). The virtual scan line data in each row of the virtual scan line buffer 600 may or may not contain edge transitions that may be detected by the edge detector and that may ultimately decode to characters (or codewords). In other words, even though the virtual scan line buffer 600 may contain pixel data corresponding to various virtual scan lines, not all of the virtual scan lines will be coincident upon a barcode and therefore contain decodable data. By way of example, the virtual scan line data shown in the virtual scan line buffer 600 illustrates five virtual scan lines (labeled "no characters") that should contain no characters upon edge detection and decoding because the virtual scan lines were not even partially coincident upon a barcode. However, three virtual scan lines were at least partially coincident upon a barcode (e.g., the 2 character VSL, 1 character VSL, and 3 character VSL). The VSL 1 data, VSL 2 data, and VSL 3 data may represent data corresponding to virtual scan lines that are decodable using default edge detection parameters. The virtual scan line buffer 600 may be implemented in software or hardware and may be allocated and de-allocated from a general memory pool. In addition, the virtual scan line buffer 600 may be of the first in, first out (FIFO) type.

With reference to edge detection module 605, after accessing data corresponding to a virtual scan line in the virtual scan line buffer 600, edge transition locations may be identified using any number of edge detection techniques (such as those previously described). Based on the edge transition locations, the virtual scan lines containing promising data can be determined. With reference to low level decoder 610, any number of suitable decoder algorithms may be used to identify if there are any valid characters or codewords in the data. For example, in the case of the Universal Product Code (UPC) symbology (where bars indicate a logical '1' and spaces indicate a logical '0'), each character comprises two spaces and two bars, the widths of which equal seven modules. Therefore, if the relative locations of the edge transitions indicate a logical sequence of 0110001, the data would be identified as promising because this logical sequence represents a character value of 5. Accordingly, in the case of the character value of 5, four edge transitions should be located in the data—a leading space that is one module in width (the '0'), followed by a bar that is two modules in width (the '11'), which is followed by a space that is three modules in width (the '000'), and an end bar that is one module in width (the '1') for a total of seven modules. Thus, the low level decoder 610 may indicate that the data is promising because it contains at least one valid character.

While the previous example illustrates a character value of 5 in the UPC symbology, other segments, characters, or codewords in other symbologies can also indicate promising data. For example, in the PDF417 symbology, each codeword has four bars and four spaces (the '4' in PDF417) for a total width of seventeen modules or units (the '17' in PDF417). Therefore, a low level decoder might indicate that the data contains one or more codewords based on the relative locations of eight edge transitions. Further, overhead characters, such as start characters, stop characters, center characters, guard characters, check characters, or any combination thereof, may indicate promising data.

Sometimes, the edge detection technique may miss an edge transition or identify an additional edge transition, causing an otherwise valid character to be determined as invalid. Accordingly, missing or additional edge transitions may indicate that the virtual scan lines contain promising data. For example, the check character may indicate that one or more of the characters in the barcode was improperly read (e.g., an edge may be missing or an additional edge may be present somewhere in the data). In addition, an edge transition may show up unexpectedly or be missing where an edge transition would otherwise be expected. For example, in a given symbology, individual characters (e.g., alphanumeric characters) within a label are comprised of a given number of elements (e.g., bars and spaces) and the width of each element is expected to be within a certain range. If the number of elements per character varies from what is expected (e.g., a character in a UPC barcode having two spaces and three bars instead of the expected two spaces and two bars), there may be missing or additional edge transitions. In addition, if the width of the elements falls outside of an expected range (e.g., the bars and spaces in a UPC barcode falling outside of the expected width of 1 through 4 modules), there may be missing or additional edge transitions.

Further, certain symbologies utilize labels divided into right and left segment halves and utilize odd parity characters in left segments and even parity characters in right segments. For example, a character value of 5 may be represented as 0110001 in odd parity or 1001110 in even parity. If an even parity character is decoded when the character was expected to be an odd parity, there may be missing or additional edge transitions. Additionally, certain symbologies utilize overhead characters, such as start/stop, guard, center characters, or any combination thereof, as delimiters or to separate segments of a barcode. If a data character is found where an overhead character is expected, an overhead characters is found where a data characters is expected, or no overhead characters is found where expected, there may be missing or additional edge transitions. Furthermore, an unprinted margin area or white space may be located outwardly of guard characters and finding characters in the unprinted margin may be probative of extra edge transitions. Additional methods to determine whether edges are missing and/or added are described in U.S. Pat. No. 6,513,714, which is hereby incorporated by reference in its entirety.

According to yet another embodiment, a virtual scan line containing promising data is identified if the total number of edge transitions exceeds a predetermined amount. For example, certain edge detection techniques may eliminate spurious edges from a surface on which the label is printed. Accordingly, a virtual scan line containing a certain number of edge transitions may be probative of promising data. Looking for a minimum number of edge transitions might be helpful when there is no feedback from the low level decoders, the high level decoders, or both. For example, if there is no feedback from the low level decoder 610, the decoder algorithms may not be able to indicate that a valid character or codeword in the data has been identified, so the low level decoder 610 may look for a specific number of edge transitions.

With reference to promising virtual scan line selection module 615, upon determining that a virtual scan line contains promising data, the data may be stored in a new memory location for additional processing, such as a promising virtual scan line buffer 625. As shown in the virtual scan line buffer 600, three virtual scan lines contain promising data (labeled "2 character VSL," "1 character VSL," and "3 character VSL"). For example, after processing the data for edge transitions the low-level decoder could identify two characters in a first virtual scan line, one character in a second virtual scan line, and three characters in a third virtual scan line. As illustrated by the arrows 620, the data may be stored in the promising virtual scan line buffer 625. The promising virtual scan line buffer 625 can be implemented in software or hardware and may be allocated and deallocated from a general memory pool. In addition, the promising virtual scan line buffer 625 may be of the first in, first out (FIFO) type.

Edge detection module 630 uses another set of edge detection parameters to locate a second set of edge transitions in the promising virtual scan line data using any number of edge detection techniques. For example, the edge detection module 630 may vary the minimum modulation percentage (e.g., the smallest modulation that will be identified as an edge). If the modulation percentage is set too low, a small change in grayscale level can erroneously trigger an edge transition (e.g., noise can triggers an edge). Likewise, if the modulation percentage is set too high, an edge transition may be missed. Accordingly, by varying the minimum modulation percentage, edge transitions that would otherwise be erroneously missed (or detected) based on a first set of edge detection parameters might be identified (or omitted) using a second set of edge detection parameters. By way of another example, the edge detection module 630 may vary the window threshold (e.g., the number of pixels that are averaged to determine an edge threshold). If the window is too large or too small, an edge may be missed or an erroneous edge may be detected. Accordingly, by varying the window threshold, edge transitions that are erroneously detected (or missed) based on a first set of edge detection parameters might be omitted (or identified) using a second set of edge detection parameters.

Thus, by varying the edge detection parameters at edge detection module 630 as compared to the edge detection parameters used at edge detection module 605, edge transitions that might otherwise be missed based on a first set of edge detection parameters may be identified using a second set of edge detection parameters. In other words, by looking more closely at virtual scan lines containing promising data, additional characters may be successfully decoded.

The edge detection parameters may be varied in other ways and the promising virtual scan line data may be manipulated in other ways. For example, if the virtual scan line data is unprocessed or minimally processed (i.e., raw data directly from the image acquisition system), any number of filters (e.g., finite impulse response (FIR) filters) may be applied to the promising unprocessed or minimally processed virtual scan line data to enhance low level signals or average out noisy signals by amplifying (or dampening) one or more spatial frequencies. Edge transition locations may then be identified in the filtered data with the same set of edge detection parameters that were used at edge detection module 605 or a different set of edge detection parameters. Thus, filtering the raw data may enhance low level signals (e.g., amplify high spatial frequencies) or average out noisy signals and allow edges that were previously missed to be identified (or edges that were erroneously identified to be omitted). By way of another example, if promising virtual scan line data is identified in data that has already been processed or filtered with a first set of parameters (e.g., a first set of filter parameters), the raw data may be processed using a different set of filter parameters (e.g., changing the number of filter taps or altering the transfer function of the filter). Then edge transition locations may be identified using the same set (or a different set) of edge detection parameters that were used at edge detection module 605. In other words, altering the parameters used to filter the raw data may allow edges that were previously missed to be identified (or edges that were erroneously identified to be omitted). The filters that amplify higher spatial frequencies may be thought of as high-pass filters with a unity gain at low frequencies and a higher gain at high spatial frequencies (or a lower gain at low frequencies and a unity gain (or higher gain) at high spatial frequencies). The filters that amplify lower spatial frequencies may be thought of as low-pass filters with a unity gain at high frequencies and a higher gain at low spatial frequencies (or a lower gain at high frequencies and a unity gain (or higher gain) at low spatial frequencies).

The edge detection module 605, the edge detection module 630, or both, may be implemented in hardware, software, firmware, or any combination thereof. Additionally, the edge detection module 630 may comprise the same component as the edge detection module 605 (but programmed with different edge detection parameters), or edge detection modules 605 and 630 may comprise separate components.

According to one embodiment, while additional data corresponding to virtual scan lines (e.g., from the same or subsequent frames) are read into the virtual scan line buffer, the second set of edge transition locations are identified. Identifying the second set of edge transition locations while additional virtual scan lines containing data are read into the virtual scan line buffer may help with sweep performance or first pass read rate because new frames can be gathered and read in while taking a closer look at the virtual scan lines containing promising data.

One or more high level decoders 635 may be provided to convert barcode elements into characters. The high level decoders 635 may be similar or identical to the high level decoder 340 (FIG. 3).

Any number of timers may be used to indicate when to stop attempting to find characters. For example, to maximize throughput, one or more of the edge detection module 605, the low level decoder 610, and the high level decoder module 635 may stop looking for edges or characters after a certain period of time or after a certain number of data frames have been captured. In other words, the timers prevent the detection and decoder blocks from spending too much time trying to decode data that is not readable/decodable (or at least not easily readable/decodable) or that has already been decoded. Another timer may be used in connection with one or more of the edge detection module 630, the low level decoder 610, and the high level decoder module 635 to indicate when to stop attempting to find characters based on the second set of edge transition locations.

According to one embodiment, the results from different edge detection parameters are evaluated to better understand element width distortion (e.g., why the width of an element is being distorted beyond specified boundaries). For example, a small modulation percentage may result in erroneous edge detection that may ultimately result in the width of one or more bars in a barcode to become distorted. If an increased modulation percentage eliminates the erroneous width, the difference between the edge detection parameters can be evaluated to better understand the cause of the width distortion so that the distortion may ultimately be minimized.

Virtual Scan Line Pattern Modification

According to one embodiment, the above methods may be used to improve data collection in subsequent frames. For example, if the low level decoder 610 identifies a promising virtual scan line (or scan line segment), the virtual scan line extraction module 310 may increase the density of scan lines proximate the location of the promising virtual scan line in a subsequent frame (or the current frame if the frame data was retained) to gather additional data content of the barcode.

Figure 7:
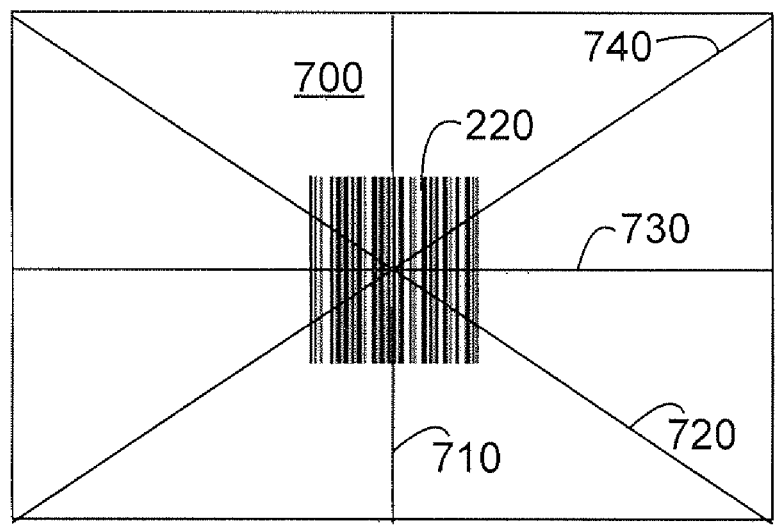
FIGS. 7 and 8 are diagrams illustrating a virtual scan line pattern modification, according to one embodiment.
Figure 8:
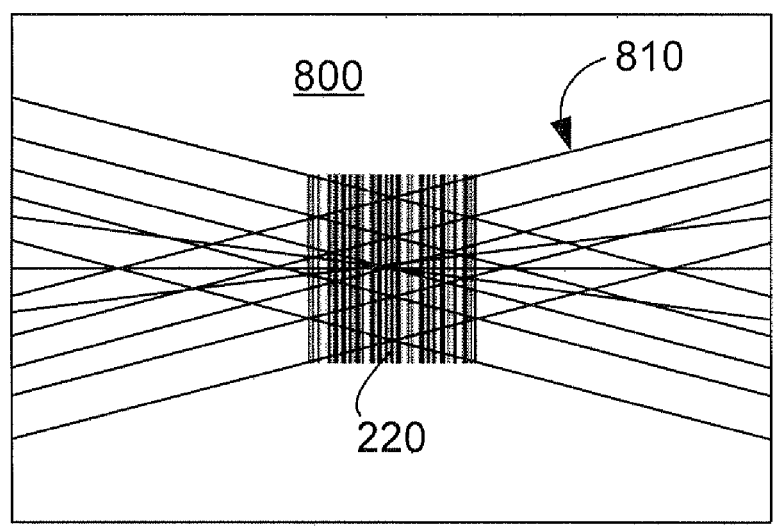

FIGS. 7 and 8 are diagrams illustrating a virtual scan line pattern modification, according to one embodiment. In FIG. 7, raster image 700 (e.g., frame N) represents an image captured of barcode 220 by the imager 250. The virtual scan line extraction module 310 may sample or read pixels from the imager 250 lying along virtual scan lines 710 through 740. If the low level decoder 610 determines that the virtual scan line 730 (and possibly virtual scan lines 720 and 740) contains promising data based on the edge transition locations identified by the edge detection module 605 using a first set of edge detection parameters, the virtual scan line extraction module 310 may modify the virtual scan lines on subsequent frames to capture additional data proximate the virtual scan line 730. For example, as shown in FIG. 8, the virtual scan line extraction module 310 may sample or read pixels from the imager 250 in the next frame (represented by raster image 800 corresponding to frame N+1) lying along a different set of virtual scan lines 810 (which are proximate the virtual scan line 730 and possibly similarly oriented). As shown in FIG. 8, the virtual scan lines 810 should capture additional data content around the virtual scan line 730.

Thus as should be appreciated in view of the teachings herein, certain embodiments may be capable of achieving certain advantages, including by way of example and not limitation one or more of the following: (1) concentrating processing efforts on sub-regions (e.g., virtual scan lines) of an acquired image that are most promising; (2) increasing sweep performance and/or first pass read rate; (3) providing smart sub-region pattern generation; (4) increasing the feasibility of character to character correlation by maintaining the relative location of the barcode and the sub-region; (5) dedicating processing efforts on one or more virtual scan lines that have captured a barcode; (6) using adaptive edge detection on specific portions of data that was not decoded with the default setting; and (7) using various equalization filters on identical data. These and other advantages of various embodiments will be apparent upon reading the following.

The methods and systems disclosed herein may be implemented in or by any suitable hardware, software, firmware, or combination thereof. Accordingly, as used herein, a component or module may comprise hardware, software, firmware, or any combination thereof (e.g., self-contained hardware or software components that interact with a larger system). For example, the methods and systems may exist as one or more software or firmware programs comprised of program instructions in source code, object code, executable code or other formats. A software module or component may include any type of computer instruction or computer executable code located within a memory device or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by the processor 150 or another processor. Alternatively, the steps may be performed by hardware components that include specific logic for performing the steps or by a combination of hardware, software, firmware, or any combination thereof. A result or output from any step, such as a confirmation that the step has or has not been completed or an output value from the step, may be stored, displayed, printed, or transmitted over a wired or wireless network. For example, the decoded data may be stored, displayed, or transmitted over a network.

Embodiments may also be provided as a computer program product embodied on a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product embodied on a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

While embodiments disclosed herein have been discussed in combination with barcodes, the embodiments disclosed herein may be utilized by other automated data collection/capture techniques including, but not limited to, laser based scanner, magnetic stripes, optical card readers, voice recognition, and smart card or radio frequency identification. In addition, while the term character has been used herein (with respect to certain embodiments) to refer to a single group of bars and spaces that represent a specific number of letters, numbers, punctuations marks, or other symbols, it may also refer to a graphical shape representing a letter, numeral, or symbol or a letter, digit, or other symbol that is used as part of the organization, control, or representation of data. Further, while certain embodiments have been described with reference to virtual scan lines, other portions (e.g., one or two dimension virtual scan lines, sub-regions, or sub-pixels) of the acquired image or the entire acquired image may be used.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method of decoding an optical code, comprising:
receiving a first data set corresponding to a sub-region of an image of the optical code;
detecting a first set of edge transition locations in the first data set using a first set of edge detection parameters;
based on the first set of edge transition locations, determining whether the first data set contains promising data;
in response to determining that the first data set contains promising data, determining a different set of edge transition locations in the promising data using a different set of edge detection parameters, wherein the different set of edge transition locations in the promising data are determined from the first data set independent of acquiring another image of the optical code; and
decoding the promising data based on the different set of edge transition locations.

2. The method of claim 1, further comprising:
acquiring the image of the optical code via an imager of a data reader.

3. The method of claim 1, further comprising:
stitching the decoded promising data together with other decoded data to form a decoded dataset representing the optical code; and
storing the decoded dataset representing the optical code.

4. The method of claim 1 wherein the sub-region comprises a virtual scan line.

5. The method of claim 1 wherein the step of determining whether the first data set contains promising data comprises identifying at least one valid character in the first data set.

6. The method of claim 1 wherein the step of determining whether the first data set contains promising data comprises identifying an overhead character in the first data set.

7. The method of claim 1 wherein the step of determining whether the first data set contains promising data comprises identifying a total number of edge transitions in the first data set that deviates from an expected number of edge transitions.

8. The method of claim 1 wherein the step of determining whether the first data set contains promising data comprises determining whether a total number of edge transitions in the first set of edge transition locations exceeds a predetermined amount.

9. The method of claim 1 wherein the different set of edge detection parameters includes a different minimum modulation percentage than that used for the first set of edge detection parameters.

10. The method of claim 1 wherein the different set of edge detection parameters includes a different window threshold than that used for the first set of edge detection parameters.

11. The method of claim 1, further comprising:
in response to determining that the first data set contains promising data, amplifying one or more spatial frequencies of the promising data and determining a different set of edge transition locations in the promising data resulting from the amplification.

12. The method of claim 1 wherein the first data set corresponding to the sub-region is selected from a set of sub-regions orientated with respect to one another in a pattern, and further comprising:
in response to determining that the first data set contains promising data, altering the pattern in a subsequent data frame to gather additional data of the optical code proximate the sub-region containing the promising data.

13. The method of claim 1 wherein the step of determining whether the first data set contains promising data comprises identifying a missing edge transition or an additional edge transition in the first set of edge transition locations.

14. The method of claim 1, further comprising:
decoding the first data set based on the first set of edge transition locations to establish a partially decoded data set including (1) one or more decoded characters that are decodable based on the first set of edge transition locations and (2) one or more undecoded characters that are not decodable based on the first set of edge transition locations;
decoding the first data set based on the different set of edge transition locations to establish a decoded data set including one or more decoded characters that are decodable based on the different set of edge transition locations, wherein the one or more undecoded characters that are not decodable based on the first set of edge transition locations are decodable based on the different set of edge transition locations;
correlating the one or more decoded characters from the partially decoded data set and the decoded data set; and
substituting the one or more undecoded characters in the partially decoded data set with the corresponding decoded characters from the decoded data set.

15. A non-transitory machine-readable storage medium for use with an optical code reader, wherein the machine-readable storage medium has instructions stored thereon for decoding an optical code in response to receiving a first data set corresponding to a sub-region of an acquired image of the optical code, the instructions comprising:
instructions for detecting a first set of edge transition locations in the first data set using a first set of edge detection parameters;
instructions for, based on the first set of edge transition locations, determining whether the first data set contains promising data;
instructions for, in response to determining that the first data set contains promising data, determining a different set of edge transition locations in the promising data using a different set of edge detection parameters, wherein the different set of edge transition locations in the promising data are determined from the first data set independent of acquiring another image of the optical code; and
instructions for decoding the promising data based on the different set of edge transition locations.

16. A method of reading optical codes, comprising the steps of:
identifying at least one sub-region of an acquired image of an optical code containing promising data based on a first set of edge detection parameters;
varying the first set of edge detection parameters to form a different set of edge detection parameters; and
decoding the promising data based on the different set of edge detection parameters, wherein the promising data is decoded based on the different set of edge detection parameters independent of acquiring another image of the optical code.

17. The method of claim 16, further comprising:
stitching the decoded promising data together with other decoded data to form a decoded dataset representing the optical code; and
storing the decoded dataset representing the optical code.

18. The method of claim 16, further comprising:
storing the promising data in a memory before the step of decoding the promising data based on the different set of edge detection parameters to thereby allow promising data in other sub-regions of the acquired image to be identified based on the first set of edge detection parameters.

19. The method of claim 16 wherein the step of decoding the promising data based on a different set of edge detection parameters is performed while additional sub-regions of the optical code are acquired.

20. The method of claim 16 wherein the step of identifying at least one sub-region that contains promising data comprises determining whether a total number of edge transitions in the optical code exceeds a predetermined amount.

21. The method of claim 16 wherein varying the first set of edge detection parameters comprises altering a window threshold of the first set of edge detection parameters.

22. The method of claim 16 wherein the step of identifying at least one sub-region that contains promising data comprises identifying at least one valid character or an overhead character in the optical code.

23. The method of claim 16 wherein the step of identifying at least one sub-region that contains promising data comprises identifying a missing edge transition or an additional edge transition in the optical code.

24. The method of claim 16 wherein varying the first set of edge detection parameters comprises altering a minimum modulation percentage of the first set of edge detection parameters.

25. The method of claim 16 wherein the step of identifying at least one sub-region that contains promising data comprises identifying a total number of edge transitions in the optical code that deviates from an expected number of edge transitions.

26. The method of claim 16, further comprising:
in response to identifying promising data based on the first set of edge detection parameters, amplifying one or more spatial frequencies of the promising data and determining a set of edge transition locations in the promising data resulting from the amplification.

27. A system for reading optical codes, comprising:
an image acquisition component for acquiring an image of an optical code;
an edge detection component for determining a first set of edge transition locations in data corresponding to a sub-region of the acquired image of the optical code using a first set of edge detection parameters;
a decoder component for determining whether the data contains promising data based on the first set of edge transition locations; and
a promising sub-region memory for storing the promising data,
wherein the edge detection component determines a different set of edge transition locations in the promising data using a different set of edge detection parameters, wherein the different set of edge transition locations in the promising data are determined from the data corresponding to the sub-region of the acquired image of the optical code independent of acquiring another image of the optical code, and wherein the decoder component decodes the promising data based on the different set of edge transition locations.

28. The system of claim 27 wherein the decoder component determines that the data contains promising data by identifying at least one valid character or an overhead character in the data.

29. The system of claim 27 wherein the decoder component determines that the data contains promising data by identifying a missing edge transition or an additional edge transition in the data.

30. The system of claim 27 wherein the decoder component determines that the data contains promising data by determining that a total number of edge transitions in the first set of edge transition locations exceeds a predetermined amount.

31. The system of claim 27 wherein the different set of edge detection parameters includes a different minimum modulation percentage than the first set of edge detection parameters.

32. The system of claim 27 wherein the decoder component determines that the data contains promising data by identifying a total number of edge transitions in the data that deviates from an expected number of edge transitions.

33. The system of claim 27 wherein the different set of edge detection parameters includes a different window threshold than the first set of edge detection parameters.

34. The system of claim 27, wherein, in response to determining that the data contains promising data based on the first set of edge transition locations, the decoder component amplifies one or more spatial frequencies of the promising data and determines a different set of edge transition locations in the promising data resulting from the amplification.

35. A method of reading optical codes, comprising the steps of:
identifying at least one sub-region of an acquired image of an optical code containing promising data based on a first set of edge detection parameters, wherein identifying at least one sub-region that contains promising data comprises identifying at least one valid character or an overhead character in the optical code;
varying the first set of edge detection parameters to form a different set of edge detection parameters; and
decoding the promising data based on the different set of edge detection parameters.

36. A method of reading optical codes, comprising the steps of:
identifying at least one sub-region of an acquired image of an optical code containing promising data based on a first set of edge detection parameters, wherein identifying at least one sub-region that contains promising data comprises identifying a missing edge transition or an additional edge transition in the optical code;
varying the first set of edge detection parameters to form a different set of edge detection parameters; and
decoding the promising data based on the different set of edge detection parameters.

37. A method of reading optical codes, comprising the steps of:
identifying at least one sub-region of an acquired image of an optical code containing promising data based on a first set of edge detection parameters;
varying the first set of edge detection parameters to form a different set of edge detection parameters, wherein varying the first set of edge detection parameters comprises altering a minimum modulation percentage of the first set of edge detection parameters; and
decoding the promising data based on the different set of edge detection parameters.

38. A method of decoding an optical code, comprising:
receiving a first data set corresponding to a sub-region of an image of the optical code;
detecting a first set of edge transition locations in the first data set using a first set of edge detection parameters;
based on the first set of edge transition locations, determining whether the first data set contains promising data;
in response to determining that the first data set contains promising data, determining a different set of edge transition locations in the promising data using a different set of edge detection parameters;
decoding the promising data based on the different set of edge transition locations;
decoding the first data set based on the first set of edge transition locations to establish a partially decoded data set including (1) one or more decoded characters that are decodable based on the first set of edge transition locations and (2) one or more undecoded characters that are not decodable based on the first set of edge transition locations;
decoding the first data set based on the different set of edge transition locations to establish a decoded data set including one or more decoded characters that are decodable based on the different set of edge transition locations, wherein the one or more undecoded characters that are not decodable based on the first set of edge transition locations are decodable based on the different set of edge transition locations;
correlating the one or more decoded characters from the partially decoded data set and the decoded data set; and
substituting the one or more undecoded characters in the partially decoded data set with the corresponding decoded characters from the decoded data set.

39. A method of reading optical codes, comprising the steps of:
identifying at least one sub-region of an acquired image of an optical code containing promising data based on a first set of edge detection parameters, wherein identifying at least one sub-region that contains promising data comprises identifying a total number of edge transitions in the optical code that deviates from an expected number of edge transitions;
varying the first set of edge detection parameters to form a different set of edge detection parameters; and
decoding the promising data based on the different set of edge detection parameters.

40. A method of reading optical codes, comprising the steps of:
identifying at least one sub-region of an acquired image of an optical code containing promising data based on a first set of edge detection parameters;
in response to identifying promising data based on the first set of edge detection parameters, amplifying one or more spatial frequencies of the promising data and determining a set of edge transition locations in the promising data resulting from the amplification;
varying the first set of edge detection parameters to form a different set of edge detection parameters; and
decoding the promising data based on the different set of edge detection parameters.

* * * * *